United States Patent
Tsuda

(10) Patent No.: US 7,081,924 B2
(45) Date of Patent: Jul. 25, 2006

(54) ELECTRONIC CAMERA WITH BATTERY CAPACITY DETECTION CAPABILITY

(75) Inventor: Yutaka Tsuda, Yokohama (JP)

(73) Assignee: Nikon Corporation, Tokyo (JP)

( * ) Notice: Subject to any disclaimer, the term of this patent is extended or adjusted under 35 U.S.C. 154(b) by 634 days.

(21) Appl. No.: 09/910,882

(22) Filed: Jul. 24, 2001

(65) Prior Publication Data

US 2002/0018137 A1    Feb. 14, 2002

(30) Foreign Application Priority Data

Jul. 25, 2000    (JP)    ............................. 2000-223446

(51) Int. Cl.
*H04N 5/225* (2006.01)
(52) U.S. Cl. .................................... 348/372
(58) Field of Classification Search ................ 348/372, 348/231.99, 231.7, 231.8; 324/427; 713/340; 320/132; 396/303
See application file for complete search history.

(56) References Cited

U.S. PATENT DOCUMENTS

| | | | | |
|---|---|---|---|---|
| 5,018,017 A | * | 5/1991 | Sasaki et al. | 348/231.3 |
| 5,153,729 A | * | 10/1992 | Saito | 348/231.6 |
| 5,159,458 A | * | 10/1992 | Murata et al. | 348/207.99 |
| 5,262,868 A | * | 11/1993 | Kaneko et al. | 348/231.9 |
| 5,627,587 A | | 5/1997 | Murata et al. | |
| 5,852,467 A | * | 12/1998 | Ogino | 348/231.1 |
| 5,944,829 A | * | 8/1999 | Shimoda | 713/340 |
| 5,963,010 A | * | 10/1999 | Hayashi et al. | 320/106 |
| 6,051,957 A | * | 4/2000 | Klein | 320/132 |
| 6,067,171 A | | 5/2000 | Yamada et al. | |
| 6,079,026 A | * | 6/2000 | Berglund et al. | 713/340 |
| 6,111,608 A | * | 8/2000 | Koizumi et al. | 348/342 |
| 6,137,292 A | * | 10/2000 | Hirsch et al. | 320/132 |
| 6,195,754 B1 | * | 2/2001 | Jardine et al. | 713/324 |
| 6,222,348 B1 | * | 4/2001 | Sato et al. | 320/149 |
| 6,384,572 B1 | * | 5/2002 | Nishimura | 320/106 |
| 6,522,361 B1 | * | 2/2003 | Higuchi et al. | 348/372 |
| 6,697,568 B1 | * | 2/2004 | Kaku | 348/231.99 |
| 6,710,809 B1 | * | 3/2004 | Niikawa | 348/372 |
| 6,771,896 B1 | * | 8/2004 | Tamura et al. | 348/231.2 |
| 6,963,368 B1 | * | 11/2005 | Shibazaki | 348/241 |
| 2002/0003576 A1 | * | 1/2002 | Konishi et al. | 348/232 |
| 2003/0210898 A1 | * | 11/2003 | Juen et al. | 348/207.99 |

FOREIGN PATENT DOCUMENTS

| | | | |
|---|---|---|---|
| JP | A 2-224473 | | 9/1990 |
| JP | 11341414 | * | 12/1999 |
| JP | 2001157088 A | * | 6/2001 |

* cited by examiner

*Primary Examiner*—David Ometz
*Assistant Examiner*—Jason Whipkey
(74) *Attorney, Agent, or Firm*—Oliff & Berridge PLC

(57) ABSTRACT

Image data photographed by an image capturing apparatus is temporarily stored in a volatile memory. The volatile memory temporarily is supplied with power from a battery to store the image data temporarily. The remaining capacity of the battery is detected, and a maintainable time of the image data maintained in the volatile memory is calculated based on the detected remaining capacity of the battery. The calculated maintainable time is displayed on a display.

20 Claims, 4 Drawing Sheets

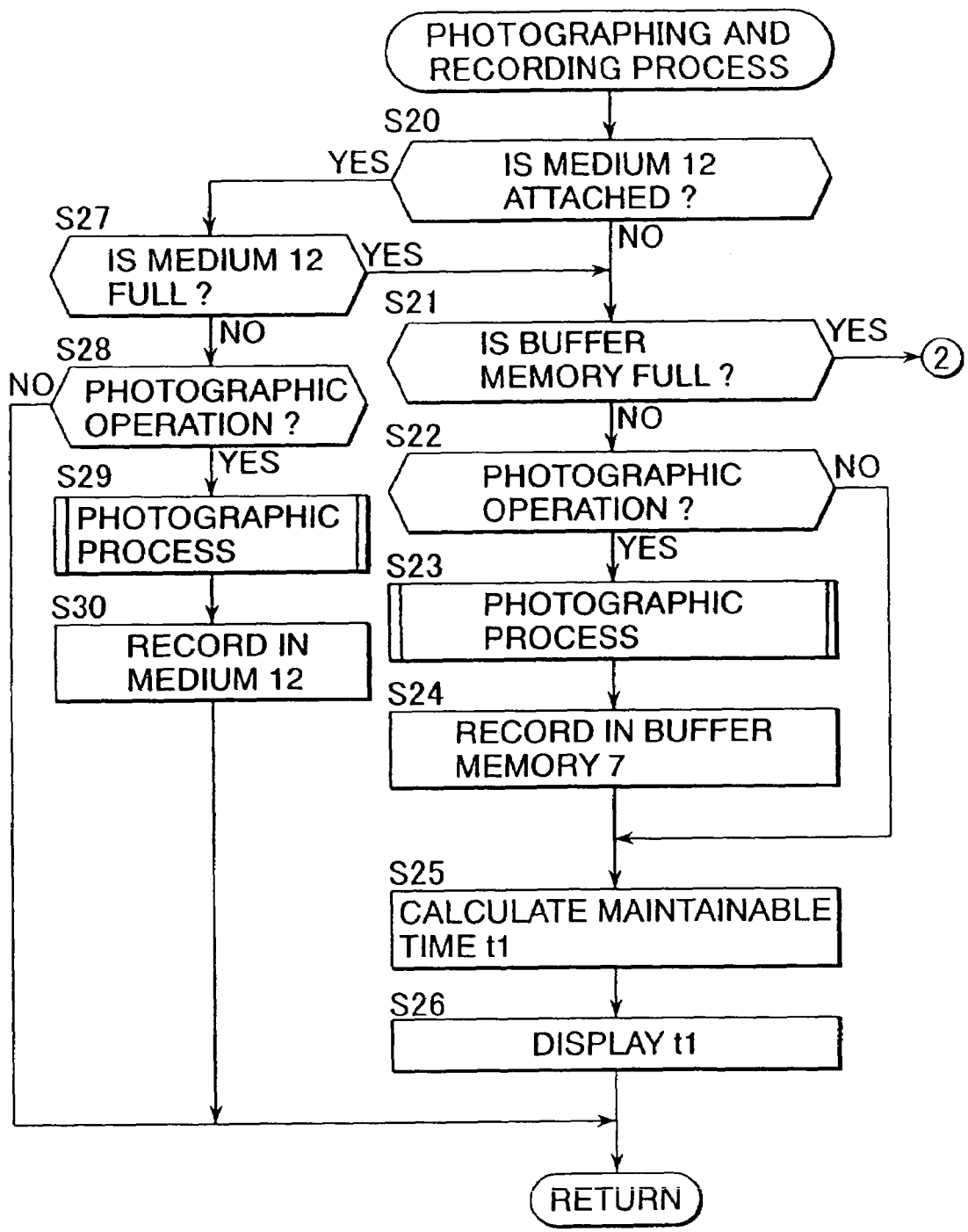

ELECTRONIC CAMERA WITH BATTERY CAPACITY DETECTION CAPABILITY

The disclosure of the following priority application is incorporated herein by reference: Japanese Patent Application No. 2000-223446 filed Jul. 25, 2000.

BACKGROUND OF THE INVENTION

1. Field of the Invention

The present invention relates to an electronic camera having a volatile memory in which image data can be temporarily recorded.

2. Description of the Related Art

Some conventional electronic cameras incorporate a buffer memory to allow continuous shooting and the like. A volatile memory is often used as such a buffer memory because of limitations on the cost, memory capacity, and so on. Image data temporarily recorded in a buffer memory is subjected to predetermined image processing and is thereafter transferred to and recorded in a data recording medium (hereinafter simply referred to as "medium") that is detachably attached to the electronic camera. The image data in the buffer memory is erased once it is transferred to and recorded in the medium.

In general, a conventional electronic camera has been controlled to indicate that the number of images that can be recorded in the medium is 0 and to disable the photographic operation of the camera when the remaining capacity of the medium falls below a capacity to accommodate the data of one image. In such a case, since the photographic operation is disabled until the medium full of image data is replaced with another medium, a problem has arisen in that a shooting opportunity can be missed because of time-consuming replacement.

SUMMARY OF THE INVENTION

It is an object of the invention to provide an electronic camera in which various pieces of time information associated with temporary storage of image data in a volatile memory are calculated based on the remaining capacity of a battery.

An electronic camera according to the invention has a volatile memory that temporarily maintains image data, a detector that detects the remaining capacity of a battery for supplying power to the volatile memory, and a maintain time calculator that calculates a maintainable time for which the image data can be maintained in the volatile memory based on the remaining capacity of the battery detected by the detector. The maintainable time can be displayed on a display unit.

Another electronic camera according to the invention has a volatile memory that temporarily maintains image data, a detector that detects the remaining capacity of a battery for supplying power to the volatile memory, a setter that sets a desired data maintain time for the volatile memory in which the image data is maintained, a maintain capacity calculator that calculates a maintain capacity that is a battery capacity to allow the image data to be maintained for the desired data maintain time, and an enabled time calculator that calculates a time during which the camera is enabled based on a capacity difference obtained by subtracting the maintain capacity from the remaining capacity of the battery. In this case, again, the camera enabled time may be displayed on a display. Further, there maybe provided a maintain time calculator that calculates a maintainable time of the image data maintained in the volatile memory based on the remaining capacity of the battery detected by the detector. In this case, the display preferably displays the camera enabled time and the maintainable time.

When a desired data maintain time is set by the setter, the desired data maintain time is preferably displayed along with the camera enabled time.

Another electronic camera according to the invention has a volatile memory which is an internal memory that temporarily maintains image data to be transferred to an external memory of the camera, e.g., a recording medium that can be attached to and detached from the camera, a detector that detects the remaining capacity of a battery for supplying power to the volatile memory, a maintain time calculator that calculates a maintainable time of the image data recorded in the volatile memory, a recording mode selector that selects a first recording mode for transferring and recording the image data to the external memory after maintaining the image data in the volatile memory temporarily and a second recording mode for recording the image data in the volatile memory, and a display that displays the maintainable time when the second recording mode is selected by the recording mode selector.

The electronic camera may have a setter that sets a desired data maintain time for the volatile memory in which image data is maintained, a maintain capacity calculator that calculates a maintain capacity that is a battery capacity to allow image data to be maintained for the maintain time, and an enabled time calculator that calculates a camera enabled time based on a capacity difference obtained by subtracting the maintain capacity from the remaining capacity of the battery. In this case, the display displays the camera enabled time and the maintainable time.

Preferably, the above-described electronic camera further has a disabling unit that disables operations of the camera other than the maintenance of image data recorded in the volatile memory when the remaining capacity of the battery is equal to or smaller than the maintain capacity.

Another electronic camera according to the invention has a volatile memory that temporarily maintains image data, a detector that detects the remaining capacity of a battery for supplying power to the volatile memory, a maintain time calculator that calculates a maintainable time of the image data maintained in the volatile memory based on the remaining capacity of the battery detected by the detector, an enabled time calculator that calculates an enabled time of the camera based on the remaining capacity of the battery detected by the detector, and a display that displays the maintainable time and the camera enabled time.

An electronic camera according to the present invention has a connecting portion communicating image data with an external memory. The external memory may be a recording medium detachably accommodated to the camera, for example and the connecting portion may be a connector to which the recording medium is inserted and pulled out.

BRIEF DESCRIPTION OF THE DRAWINGS

FIG. 4 is a flow chart that details the photographing and recording operation in the flow chart shown in FIG. 3.

DESCRIPTION OF THE PREFERRED EMBODIMENT

Figure 1:
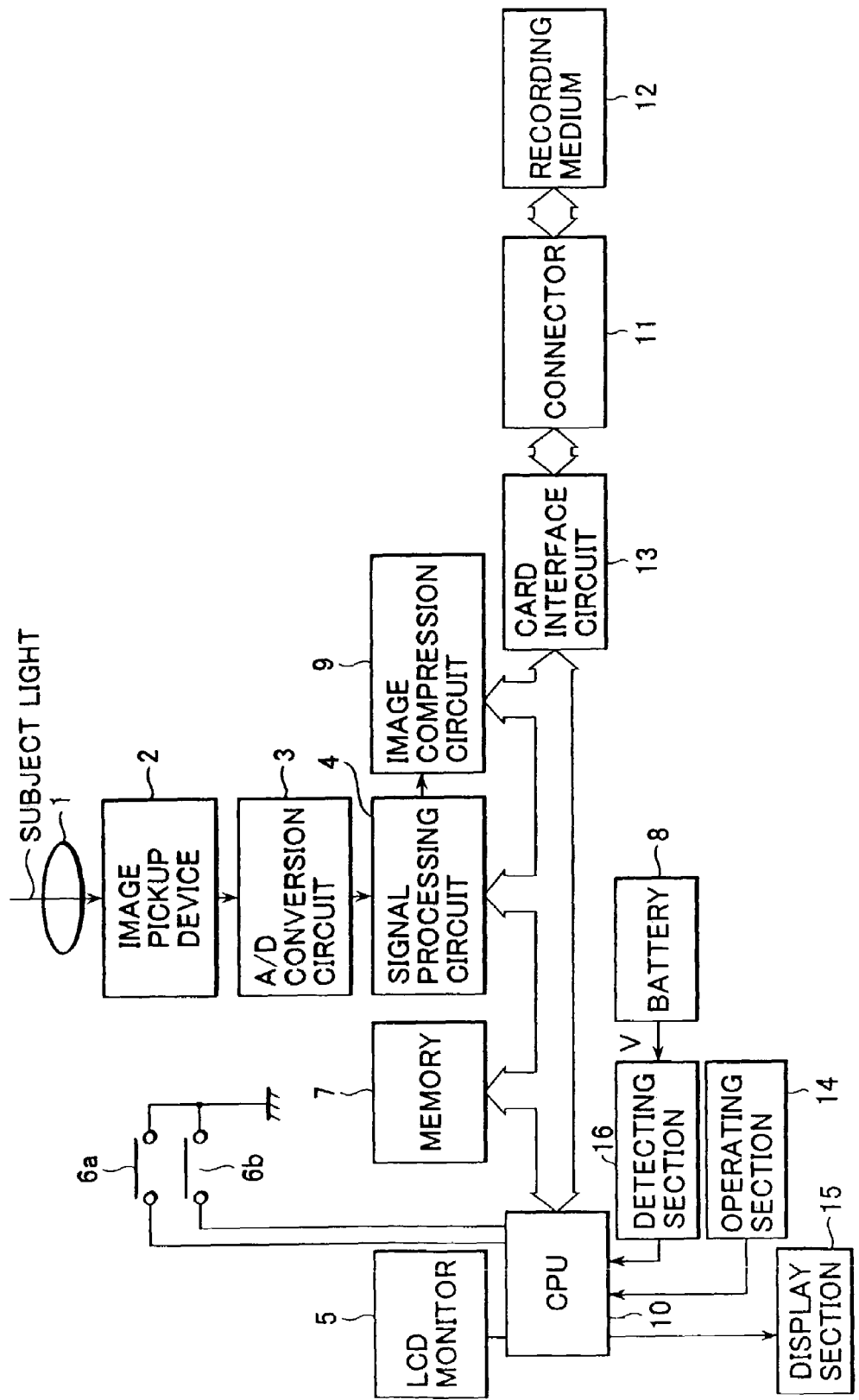
FIG. 1 is a block diagram showing a schematic configuration of an application of the invention to a digital still camera.

An embodiment of the invention will now be described with reference to FIGS. 1 through 4. FIG. 1 is a diagram showing an embodiment of an electronic camera according to the invention, and it is a block diagram showing a schematic configuration of a digital still camera. An image pickup device 2 that is a CCD, CMOS image sensor or the like is provided behind a photographic lens 1 (or under the lens 1 in the figure), and subject light incident upon the photographic lens 1 forms an image on an image pickup surface of the image pickup device 2. An image signal output by the image pickup device 2 is converted by an A/D conversion circuit 3 into a digital signal which is then input to a signal processing circuit 4. The signal processing circuit 4 performs image processing such as contour compensation and gamma compensation on the digital signal thus converted.

The image data which has been subjected to image processing such as gamma compensation at the signal processing circuit 4 is subjected to a thinning process or the like depending on the display resolution of an LCD monitor 5 and is displayed on the LCD monitor 5. The series of operations from the photographing at the image pickup device 2 up to the thinning process described above is repeated to update the image (referred to as "through image") displayed on the LCD monitor 5 sequentially at predetermined intervals. The focus of the photographic lens 1 is continually adjusted by an AF device which is not shown to display an image in focus on the LCD monitor 5.

6a and 6b represent a half-press switch and a full-press switch which are respectively associated with operations of pressing the release button of the electronic camera halfway and completely. When the half-press switch 6a is turned on, the luminance of the subject is measured by a photometer which is not shown. When the release button is thereafter pressed completely to turn the full-press switch 6b on, an image signal is output by the image pickup device 2. The image signal is converted by the A/D conversion circuit 3 into a digital signal which is then processed by the signal processing circuit 4 and is temporarily stored in a buffer memory 7.

The buffer memory 7 is a volatile memory such as a DRAM. Data is maintained in the buffer memory 7 only when power is supplied from a battery 8, and the maintained data is lost when the supply of power is stopped. Image data stored in the buffer memory 7 is read into an image compression circuit 9 and is stored in the buffer memory 7 again after being subjected to a data compression process according to the JPEG compression method or the like. The image data stored in the buffer memory 7 is recorded in a recording medium 12 after date and time data, the shutter speed, and the stop value are added thereto. A volatile memory card such as a PC card or CF card is used as the recording medium 12. The recording medium is detachably attached to a connector 11 in a slot provided on the electronic camera. The recording medium may be replaced by an external memory to which image data is transferred through a cable or on a wireless basis.

A CPU 10 which controls the camera as a whole calculates a maintainable time, a camera enabled time, a maintain capacity, and so on to be described later. The calculated times are displayed on a display section or a monitor 15. The display section 15 is supplied with power from a battery (not shown) that is provided separately from the battery 8 for driving the camera. This battery is used as a power source for a clock function and so on. A detecting section 16 for detecting the remaining capacity of the battery 8 calculates the remaining capacity based on the voltage V of the battery 8. 13 represents an interface circuit for connecting the connector 11 and CPU 10, and 14 represents an operating section for inputting various instructions (for mode setting, setting of a desired data maintain time, and so on to be described later) to the camera.

<Description of Functions>

Major functions of the electronic camera of the present embodiment will now be described.

(a) Two Types of Recording Modes (Normal Mode and Internal Recording Mode)

The electronic camera of the present embodiment can record photographed image data in two modes. One is a mode in which data is recorded in the recording medium 12 in the same manner as that in a normal camera, and such setting is referred to as "normal mode". The other is a mode in which image data is recorded and maintained in the buffer memory 7 provided inside the camera and which is referred to as "internal recording mode". Selection between those modes may be automatically carried out by the camera depending on whether the recording medium 12 is full of image data or whether the recording medium 12 is attached or not, and the selection may alternatively be made by the photographer through an operation on the operating section 14.

In the internal recording mode, photographing can be carried out even if no recording medium 12 is attached to the camera or even if a recording medium 12 that is attached is full of image data, and the photographed image data is entirely recorded in the buffer memory 7. At this time, the CPU 10 calculates how long the image data recorded in the buffer memory 7 can be maintained by the remaining capacity of the battery 8. A maintainable time t1 thus calculated is displayed on the display section 15.

Figure 2:
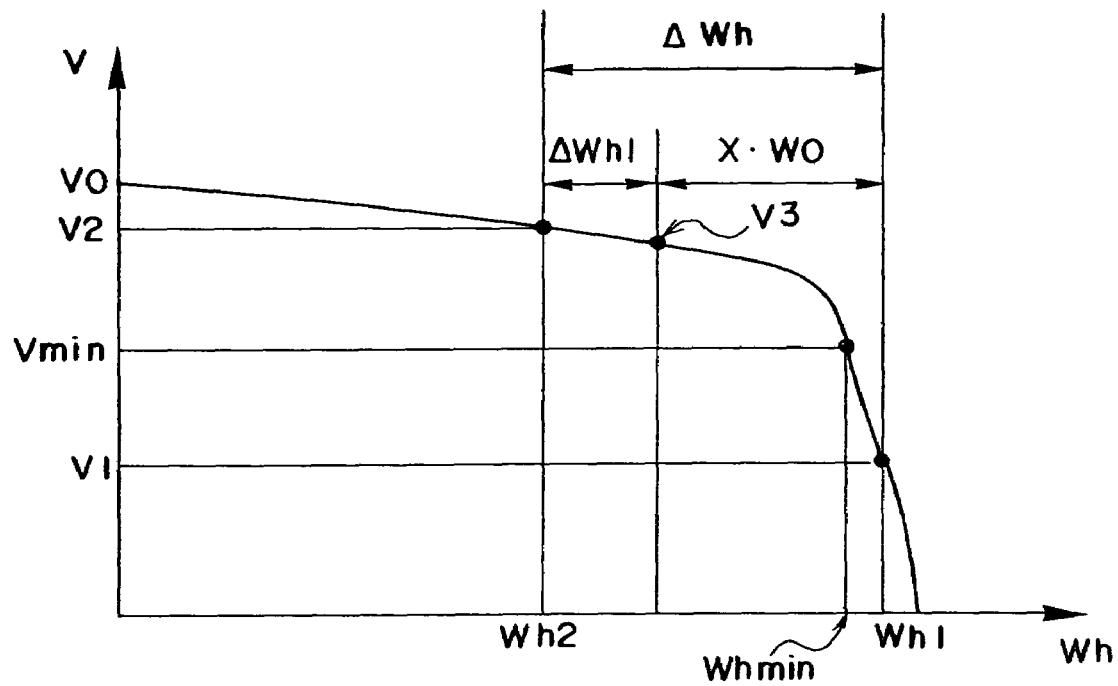
FIG. 2 is a diagram that qualitatively shows relationship between the voltage of a battery 8 and a discharge capacity.

FIG. 2 is a diagram that qualitatively shows relationship between the voltage V of the battery 8 and a discharge capacity Wh. The voltage V is 0 when the discharge capacity is 0. The voltage V linearly decreases as the discharge capacity increases, and the voltage drop abruptly increases near the end of discharge when the remaining capacity approaches zero. Vmin represents a lower limit of voltages at which a photographic operation and display of an image on the LCD monitor 5 are enabled, i.e., voltages at which the camera is enabled. In the present embodiment, the operation of the camera is disabled when the battery voltage is equal to or lower than Vmin. As will be described later, a data maintaining function for maintaining image data in the buffer memory 7 only works in the operation disabled state of the camera.

Vmin represents a lower limit voltage to use the device as a camera. When it is only required to maintain image data in the buffer memory 7, it can be used at a voltage V1 (<Vmin). For example, when the voltage of the battery 8 is represented by V2, the remaining capacity $\Delta Wh$ of the battery is given by Equation (1) shown below. When the power required for maintaining data is represented by W0, the above-described maintainable time t1 is calculated according to Equation (2). Voltage-discharge capacity characteristics as shown in FIG. 2 are stored as a table in the electronic camera of the present embodiment in advance.

$$\Delta Wh = Wh1 - Wh2 \quad (1)$$

$$t1 = \Delta Wh / W0 \quad (2)$$

A camera enabled time t2 calculated according to Equation (3) shown below may be displayed on the display section 15 along with the above-described maintainable time. W1 in Equation (3) represents power consumed to display images on the LCD monitor 5, and t2 represents a time for which images can be successively displayed. The number of images that can be photographed may be displayed instead of the camera enabled time t2. The number of images that can be photographed is obtained by dividing ($Wh_{min}$−Wh2) by the amount Wh0 of power consumed to photograph one image. The camera enabled time t2 and the number of images that can be photographed may be displayed regardless of the above-described modes.

$$t2=(Wh_{min}-Wh2)/W1 \quad (3)$$

(b) Function of Setting Desired Data Maintain Time

A desired maintain time can be set for image data maintained in the buffer memory 7. The setting operation is performed with the operating section 14. For example, when a time x is set as a desired data maintain time, the capacity required for maintaining the data for the time x (maintain capacity) is x·W0. When the battery voltage at the time of setting is V2, since the remaining capacity ΔWh is given by Equation (1), a difference ΔWh1 between the remaining capacity and the maintain capacity is given by Equation (4). In the desired maintain time setting state, a time t3 that is calculated according to Equation (5) is displayed on the display section 15 as a camera enabled time.

$$\Delta Wh1=\Delta Wh-x\cdot W0=(Wh1-Wh2)-x\cdot W0 \quad (4)$$

$$t3=\Delta Wh1/W1 \quad (5)$$

The photographer can recognize how long the camera can be used from the indication of the time t3. In this case, the number of images that can be photographed which is calculated based on ΔWh1/Wh0 may be displayed instead of the time t3. When the remaining capacity ΔWh becomes equal to x·W0 or when the battery voltage becomes V3 in FIG. 2, operations of the camera are automatically disabled except the operation of maintaining image data in the buffer memory 7. Since the data is maintained for the time x after the disablement, the recording medium 12 is attached to the camera during that time to preserve the image data by transferring the image data to the same or transferring it from the camera to a personal computer or the like. At this time, the preserving operation is performed with power supplied to the camera using an AC adaptor or the like.

<Description of Operations>

Figure 3:
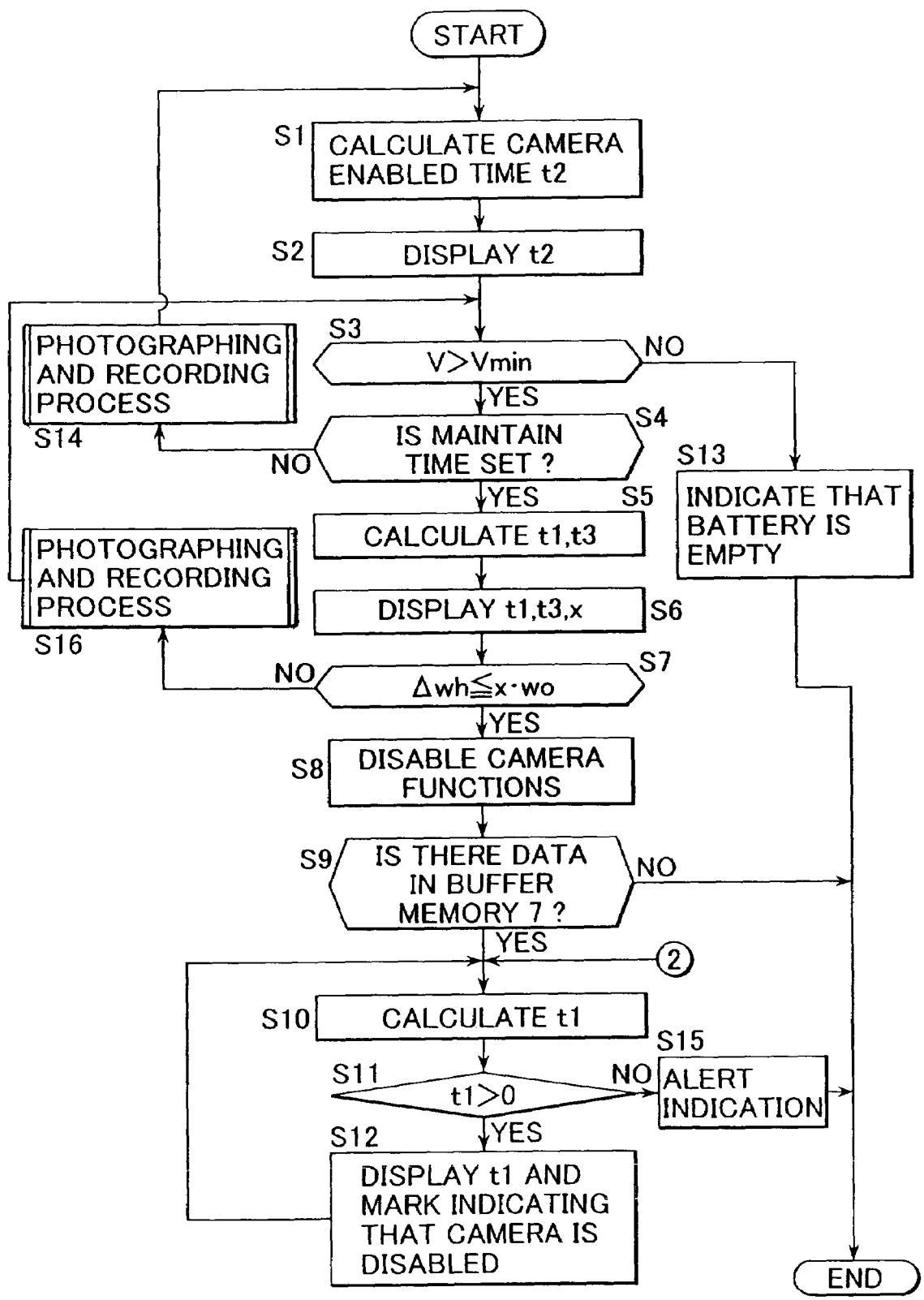
FIG. 3 is a flow chart for explaining an operation of a camera.

Operations of the camera will now be described with reference to the flow chart in FIGS. 3 and 4. FIGS. 3 and 4 show a main routine and a sub-routine of the flow chart, respectively. The flow in FIG. 4 is started when the camera starts to be supplied with the power supply. At step S1, the voltage V2 of the battery 8 is detected, and the camera enabled time t2 is calculated according to the above-described Equation (3) based on the voltage V2. At step S2, the camera enabled time t2 calculated at step S1 is displayed on the display section 15. Step S3 is a step for judging whether the voltage V of the battery 8 is higher than the voltage Vmin that is the lowest voltage enabling photography by the camera. The process proceeds to step S4 when V is judged to be higher than Vmin, and the process proceeds to step S13 when V is judged to be equal to or lower than Vmin.

When the process proceeds from step S3 to step S13, at step S13 the display unit 15 indicates that the battery 8 is empty and then the series of processes is terminated. It is judged at step S4 whether a desired maintain time has been set through an operation on the operating section 14. If yes, the process proceeds to step S14 and, if not, the process proceeds to step S5.

A description will be made on the case in which a desired maintain time is set, i.e., the process proceeds from step S4 to step S5. At step S5, the maintainable time t1 and the camera enabled time t3 are calculated according to Equations (2) and (5), and the times t1 and t3 and the set time x are displayed on the display section 15 at step S6. The camera enabled time t3 is the required time for which the battery voltage V2 at the present time decreases to V3 as shown in FIG. 2. V3 is the battery voltage at the time when data maintenance is started.

At step S7, it is judged whether the remaining capacity ΔWh of the battery 8 is equal to or smaller than the maintain capacity x·W0 required for maintaining the image data or whether to start data maintenance. If it is judged that ΔWh >x·W0 and that photographing is still enabled, the process proceeds to step S16. If it is judged that ΔWh≦x·W0 and that data maintenance is to be started, the process proceeds to step S8. When the process proceeds to step S8, CPU10 disables all functions other than the function of maintaining data. The process at step S16 will be described later.

At step S9, it is judged whether image data has been recorded in the buffer memory 7. If it is judged that no image data has been recorded, the series of operations is terminated without the operation of maintaining data. If it is judged that image data has been recorded, the process proceeds to step S10 to calculate the maintainable time t1. At step S11, it is judged whether the calculated maintainable time t1 is greater than 0 or whether a capacity to maintain the data is left. If it is judged that t1>0, the process proceeds to step S12 and, if it is judged that t1≦0, the process proceeds to step S15.

When the process proceeds to step S12, the display section 15 displays the maintainable time t1 and a indication or mark representing that the camera is disabled, and the process thereafter returns to step S10. When the process proceeds to step S15, the display section 15 displays a warning mark indicating that the data can not be maintained and then the series of operations is terminated. Referring to the alert indication at step S15, an LED or the like may be provided and blinked on the camera.

A description will now be made on the case in which ΔWh>x·W0 is judged in the above-described step S7 and the process proceeds to step S16. FIG. 4 shows a subroutine that represents the process at step S16. At step S20, it is judged whether a recording medium 12 is attached to the camera. If yes, the process proceeds to step S27 and, if not, the process proceeds to step S21.

At step S21, it is judged whether the buffer memory 7 is full of image data or whether no image data can be recorded in the buffer memory 7. If it is judged at step S21 that the memory is full of image data, the process exits the subroutine in FIG. 4 to proceed to step S10 in FIG. 3. If it is judged that there is a room for further recording, the process proceeds to step S22. It is judged at step S22 whether the full-press switch 6b in FIG. 2 has been turned on to perform a photographic operation. If a photographic operation has been performed, the process proceeds to step S23 to perform a photographic process. At step S24, the photographed image data is recorded in the buffer memory 7. If it is judged at step S22 that a photographic operation has not been performed, the process skips steps S23 and S24 to proceed to step S25.

At step S25, a maintainable time t1 is calculated according to Equation (2), and the maintainable time t1 is displayed on the display section 15 at step S26. When the process at step S26 is finished, the series of operations shown in FIG. 4 is terminated to return to the main routine in FIG. 3, and the process further returns to step S3 from step S16.

When the process proceeds to step S14 based on a judgment at the above-described step S4 that a maintain time has been set, the process returns to step S1 after the photographing and recording processes shown in FIG. 4. The photographing and recording processes in FIG. 4 will not be described here because they have been described at step S16.

If it is judged at step S27 that the recording medium 12 is full, the process proceeds to step S21. If the answer at step S27 is negative, the process proceeds to step S28. If it is judged at step S28 that a photographic operation is in progress, the process proceeds to step S29 to perform the above-described photographic process. Thereafter, the photographed image data is transferred to and recorded in the recording medium 12 at step S30. When the answer at step S28 is negative, the process returns to a predetermined step.

When it is judged at step S27 that the recording medium 12 is full or when it is judged at step S21 that the buffer memory 7 is full, an indication may be displayed on the display section 15 to indicate that no data can be preserved in the recording medium 12 or buffer memory 7.

As described above, the camera of the present embodiment has the following advantages.

(1) Since image data can be recorded in the buffer memory 7 even if no recording medium 12 is available, a shooting opportunity will not be missed even in the case of a sudden need for photographing.

(2) Since image data is recorded and preserved in the buffer memory 7 when the recording medium 12 is not attached or when the recording medium 12 is full of image data, a shooting opportunity will not be missed due to mounting or replacement of the recording medium 12 unlike a conventional camera.

(3) Since a camera enabled time is displayed on the display section 15 when a desired data maintain time is set, one can easily recognize how long the photographic operation is enabled, which makes it possible to take pictures without being pressed for time. Further, since functions of the camera other than data maintenance function are automatically disabled when the remaining capacity of the battery 8 becomes equal to or smaller than a maintain capacity that is required for maintaining data, it is possible to avoid situations in which the camera is overused to reduce the data maintainable time below a scheduled time.

(4) Since a maintainable time t1 is displayed on the display section 15 when a maintain time is set, one can always recognize how long data can be maintained in the buffer memory 7, which makes it possible to avoid situations in which the maintain time is used up before a preserving operation.

What is claimed is:

1. An electronic camera comprising:
 a volatile memory that has a capacity sufficient to temporarily maintain image data of a plurality of images to be transferred to an external memory;
 a detector that detects a remaining capacity of a battery for supplying power to said volatile memory; and
 a maintain time calculator that calculates a maintainable time of the image data maintained in said volatile memory based on the remaining capacity detected by said detector, wherein the maintainable time is a time period during which the remaining capacity of the battery is sufficient to maintain image data recorded in the volatile memory after operation of the electronic camera is disabled.

2. An electronic camera according to claim 1, further comprising a display for displaying the maintainable time.

3. An electronic camera according to claim 2, further comprising a connecting portion communicating image data with the external memory.

4. An electronic camera according to claim 3, the external memory comprises a recording medium detachably accommodated to the camera, and said connecting portion comprises a connector.

5. An electronic camera according to claim 1, further comprising an enabled time calculator that calculates a time during which the camera is enabled based upon the remaining capacity detected by said detector, the enabled time being different from the maintainable time.

6. An electronic camera comprising:
 a volatile memory that temporarily maintains image data;
 a detector that detects a remaining capacity of a battery for supplying power to said volatile memory;
 a setter that sets a desired data maintain time for said volatile memory in which the image data is maintained;
 a maintain capacity calculator that calculates a maintain capacity that is a battery capacity to allow the image data to be maintained for the desired data maintain time; and
 an enabled time calculator that calculates a time during which the camera is enabled based on a capacity difference obtained by subtracting the maintain capacity from the remaining capacity of the battery.

7. An electronic camera according to claim 6, further comprising a display for displaying the camera enabled time.

8. An electronic camera according to claim 7, further comprising a maintain time calculator that calculates a maintainable time of the image data maintained in said volatile memory based on the remaining capacity of the battery detected by said detector, wherein said display displays the camera enabled time and the maintainable time.

9. An electronic camera according to claim 8, further comprising a disabling unit that disables operations of the camera other than the maintenance of image data recorded in said volatile memory when the remaining capacity of the battery is equal to or smaller than the maintain capacity.

10. An electronic camera according to claim 7, wherein said display displays the desired data maintain time set by said setter along with the camera enabled time.

11. An electronic camera according to claim 10, further comprising a disabling unit that disables operations of the camera other than the maintenance of image data recorded in said volatile memory when the remaining capacity of the battery is equal to or smaller than the maintain capacity.

12. An electronic camera according to claim 7, further comprising a connecting portion communicating image data with an external memory.

13. An electronic camera according to claim 12, the external memory comprises a recording medium detachably accommodated to the camera, and said connecting portion comprises a connector.

14. An electronic camera according to claim 7, further comprising a disabling unit that disables operations of the camera other than the maintenance of image data recorded in said volatile memory when the remaining capacity of the battery is equal to or smaller than the maintain capacity.

15. An electronic camera according to claim 6, further comprising a disabling unit that disables operations of the camera other than the maintenance of image data recorded in said volatile memory when the remaining capacity of the battery is equal to or smaller than the maintain capacity.

16. An electronic camera comprising:
- a volatile memory that has a capacity sufficient to temporarily maintain image data of a plurality of images to be transferred to an external memory of the camera;
- a detector that detects a remaining capacity of a battery for supplying power to said volatile memory;
- a maintain time calculator that calculates a maintainable time of the image data recorded in said volatile memory based on the remaining capacity of the battery detected by said detector, wherein the maintainable time is a time period during which the remaining capacity of the battery is sufficient to maintain image data recorded in the volatile memory after operation of the electronic camera is disabled;
- a recording mode selector that selects one of a first recording mode for transferring and recording the image data to the external memory after maintaining the image data in said volatile memory temporarily and a second recording mode for recording the image data in said volatile memory; and
- a display for displaying the maintainable time when the second recording mode is selected by said recording mode selector.

17. An electronic camera according to claim 16, further comprising:
- a setter that sets a desired data maintain time for said volatile memory in which image data is maintained;
- a maintain capacity calculator that calculates a maintain capacity that is a battery capacity to allow image data to be maintained for the desired data maintain time; and
- an enabled time calculator that calculates a camera enabled time based on a capacity difference obtained by subtracting the maintain capacity from the remaining capacity of the battery, wherein
- said display displays the camera enabled time and the maintainable time.

18. An electronic camera according to claim 17, further comprising a disabling unit that disables operations of the camera other than the maintenance of image data recorded in said volatile memory when the remaining capacity of the battery is equal to or smaller than the maintain capacity.

19. An electronic camera according to claim 16, further comprising an enabled time calculator that calculates a time during which the camera is enabled based upon the remaining capacity detected by said detector, the enabled time being different from the maintainable time.

20. An electronic camera comprising:
- a volatile memory that temporarily maintains image data;
- a detector that detects a remaining capacity of a battery for supplying power to said volatile memory;
- a maintain time calculator that calculates a maintainable time of the image data maintained in said volatile memory based on the remaining capacity of the battery detected by said detector;
- an enabled time calculator that calculates a camera enabled time based on the remaining capacity of the battery detected by said detector; and
- a display that displays the maintainable time and the camera enabled time.

* * * * *